United States Patent [19]

Kerscher et al.

[11] Patent Number: 5,254,632
[45] Date of Patent: Oct. 19, 1993

[54] METHOD OF MANUFACTURING POLYALKYL METHACRYLATE MACROMONOMERS, AND USE OF SAME IN THE MANUFACTURE OF COMB POLYMERS

[75] Inventors: Volker Kerscher, Reinheim; Werner Siol, Darmstadt-Eberstadt, both of Fed. Rep. of Germany

[73] Assignee: Rohm GmbH Chemische Fabrik, Darmstadt, Fed. Rep. of Germany

[21] Appl. No.: 907,560

[22] Filed: Jul. 2, 1992

[30] Foreign Application Priority Data

Jul. 2, 1991 [DE] Fed. Rep. of Germany ....... 4121811

[51] Int. Cl.$^5$ ..................... C08F 265/04; C08F 18/00
[52] U.S. Cl. ..................................... 525/309; 526/320
[58] Field of Search ......................... 526/320; 525/309

[56] References Cited

U.S. PATENT DOCUMENTS

| | | | |
|---|---|---|---|
| 3,893,988 | 7/1975 | Seymour et al. | 526/320 |
| 4,649,062 | 3/1987 | Kosiorek et al. | 526/320 |
| 4,680,358 | 7/1987 | Yu | 526/320 |
| 5,026,807 | 6/1991 | Ohira et al. | 526/320 |
| 5,028,677 | 7/1991 | Janowicz | 526/320 |

FOREIGN PATENT DOCUMENTS

| | | |
|---|---|---|
| 0248574 | 12/1987 | European Pat. Off. |
| 0287019 | 10/1988 | European Pat. Off. |
| 0291662 | 11/1988 | European Pat. Off. |
| 0357036 | 3/1990 | European Pat. Off. |
| 2723905 | 11/1989 | Fed. Rep. of Germany |
| 3902653 | 8/1990 | Fed. Rep. of Germany |
| 2096023 | 2/1972 | France |
| 2352008 | 12/1977 | France |
| 58-167471 | 10/1983 | Japan ................................ 526/320 |
| 59-193968 | 11/1984 | Japan ................................ 526/320 |
| 1-213347 | 8/1989 | Japan ................................ 526/320 |
| 2152947 | 8/1985 | United Kingdom ................ 526/320 |

*Primary Examiner*—Joseph L. Schofer
*Assistant Examiner*—N. Sarofim
*Attorney, Agent, or Firm*—Oblon, Spivak, McClelland, Maier & Neustadt

[57] ABSTRACT

A macronomer of Formula I:

$$\begin{array}{c} R_1 \quad\quad\quad\quad CH_3 \\ | \quad\quad\quad\quad\quad | \\ H_2C=C-C-O-X-(CH_2-C)_{\overline{n}}H \\ \quad\quad \| \quad\quad\quad\quad | \\ \quad\quad O \quad\quad\quad\quad C=O \\ \quad\quad\quad\quad\quad\quad | \\ \quad\quad\quad\quad\quad\quad OR_2 \end{array} \quad\quad I$$

wherein $R_1$ is hydrogen or methyl, X is a biradical, $R_2$ is an alkyl group of 1–40 carbon atoms and n is such that the molecular weight of the macromonomer ranges from 500–100,000 Dalton is prepared by transesterifying a monomeric ester of Formula II $$\begin{array}{c} R_1 \\ | \\ CH_2=C-COOR_3 \end{array} \quad\quad II$$

where $R_3$ represents an alkyl group with 1–8 C atoms, with a hydroxyl-group-terminated polyalkyl methacrylate of Formula III $$\begin{array}{c} CH_3 \\ | \\ HO-X-(CH_2)-C)_{\overline{n'}}-H \\ \quad\quad\quad\quad\quad | \\ \quad\quad\quad\quad\quad C=O \\ \quad\quad\quad\quad\quad | \\ \quad\quad\quad\quad\quad OR_2 \end{array} \quad\quad III$$

where X and $R_2$ have the same meanings as above, and n'=n;

with the elimination of alcohol $HOR_3$, thereby resulting in formation of the compound of Formula I.

5 Claims, No Drawings

METHOD OF MANUFACTURING POLYALKYL METHACRYLATE MACROMONOMERS, AND USE OF SAME IN THE MANUFACTURE OF COMB POLYMERS

BACKGROUND OF THE INVENTION

1. Field of the Invention

The invention relates to a method of manufacturing polyalkyl methacrylate macromonomers, and use of same in the manufacture of comb polymers.

2. Description of the Background

Macromonomers are defined as polymers with a polymerizable, in particular radically polymerizable, end group, and have a molecular weight in the range 500–100,000, particularly in the range 2,000–50,000.

The manufacture of macromonomers is described at length in the literature (Rempp, P. F., and Franta, E., 1984 *Adv. Polym. Sci.*, 58, 1; Albrecht, K., and Wunderlich, W., 1986 *Angew. Makromol. Chem.*, 145/146, 89–100; Mark, H., et al., 1987, "Encyclopedia of Polymer Science & Technology", 2nd Ed., Vol. 9, pub. J. Wiley & Sons, 195–204; Rempp, P., Franta, E., Masson, P., and Lutz, P., 1986 *Progr. Colloid & Polymer Sci.*, 72, 112–118; Rempp, P., et al., 1982 *Makromol. Chem. Rapid Commun.* 3, 499–504; Corner, T., 1984, "Advances in Polymer Science", No. 62, 95–144; Rempp, Paul F., and Franta, Emile, 1984, "Advances in Polymer Science", No. 58, 1–50; Gnanou, Yves, and Lutz, Pierre, 1989 *Makromol. Chem.*, 190, 577–588; Tsukahara, Y., et al., 1989 *Macromolecules*, 22, 1546–1552; Tsukahara, Y., et al., 1989 *Polym. J.*, 21, 377–391; and Ger. Pat. 2,723,905.

It is well known that macromonomers may be obtained via anionic and cationic "living polymerization", and via radical polymerization, by which the polymerizable end group is provided by means of initiation or chain cleavage, with or without subsequent chemical reaction.

Another interesting proposal for synthesizing macromonomers is provided by the method of "group transfer polymerization" (GTP) (see Mark, H. F., et al., 1987, "Encyclopedia of Polymer Science and Technology", 2nd Ed., Vol. 7, pub. J. Wiley & Sons, 580–588). Molecular weight is determined by gel permeation chromatography (see Mark, H. F., et al., ibid., Vol. 10, 1–19).

The glass transition temperature Tg is determined as described by Turi, E. A., 1981, "Thermal Characterization of Polymeric Materials", pub. Academic Press, New York; and/or Vieweg-Esser, 1975, "Kunststoff-Handbuch: Vol. IX, Polymethacrylate", pub. Carl Hanser Verlag, 333–340.

In Ger. OS 39 02 653, elastomers based on acrylates are described which are comprised of at least 40 wt. % and as much as 100 wt. % of one or more copolymers having a molecular weight >50,000 Dalton, which copolymers are comprised of:

acrylate monomer units, in the amount of 50–95 wt. %; and macromonomers, comprising a vinyl group and thus covalently bonded, which macromonomers are comprised of a polyvinyl unit which is chosen from the group of acrylates and methacrylates and (possibly substituted) styrenes. The macromonomers have a glass transition temperature $\geq 60°$ C. and molecular weight of 500–100,000 Dalton.

A method of manufacturing comb polymers is described in Eur. OS 357,036. Also, graft copolymers with a comb structure and a very narrow molecular weight distribution of the monomers are described in Ger. Pat. 2,723,905.

As a rule, the manufacturing methods for macromonomers disclosed in the art lead, by plausible chemical mechanisms, primarily to products having reactive and/or activatable groups, which one may be able to modify chemically with the use of customary organic reactions, to produce the desired macromonomers. The available range of variations is determined primarily by the nature of the reactive and/or activatable groups, but also to a certain extent by the nature of the monomer units in the structure in which the monomer units are combined. The OH group, for example, can function as such a reactive group. It can be converted to a terminal monomer function by interaction with suitable acylating agents which contain polymerizable units, e.g. such agents as an isocyanate-substituted (meth)acrylic acid alkyl ester, or (meth)acrylic acid anhydride.

The acylating systems are relatively reactive, as is known from synthetic organic chemistry, and as a rule such regulated reactions require careful control as they proceed, generally in inert media; and even with such control measures side reactions are a possibility. A need therefore continues to exist for a method of preparing macromonomers under mild conditions and in improved yield.

SUMMARY OF THE INVENTION

Accordingly, one object of the present invention is to provide a method of synthesizing macromonomers under mild conditions and in good yields.

Briefly this object and other objects of the present invention as hereinafter will become more readily apparent can be attained by a method of manufacturing macromonomers of formula I:

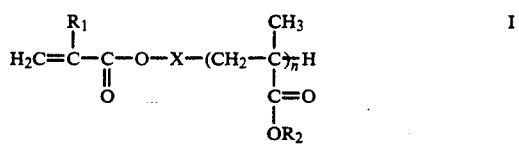

wherein $R_1$ is hydrogen or methyl;

X is a biradical group; and $R_2$ is an alkyl group with 1–40 C atoms; and n is such that the molecular weight of the macromonomer I is in the range 500–100,000 Dalton;

by conducting transesterification between monomeric esters of formula II:

wherein $R_3$ is an alkyl group with 1–8 C atoms, and a hydroxyl-group-terminated polyalkyl methacrylate of formula III:

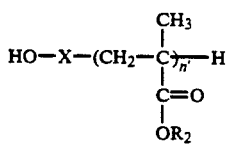

wherein X, $R_2$ have the same meanings as above, and $n'=n$; which results in the elimination of alcohol $HOR_3$, resulting in formation of the compound of formula I.

DETAILED DESCRIPTION OF THE PREFERRED EMBODIMENTS

The result of the present method is particularly significant in that the ester groups $-COOR_2$ in formulae I and III are not attacked, or are attacked only to a negligible extent during the reaction.

Preferably the biradical group X of reactant III represents a hydrocarbon chain having 2–30 members, preferably directly connected to the polymeric part of I by an —S— bridge. Possibly up to 9 carbon members of X may be replaced by ether oxygen atoms. The chain in the group X may also be interrupted by functional groups of formula:

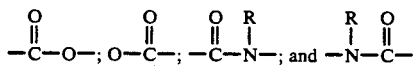

where R represents hydrogen or an alkyl group with 1-8 C atoms, or a phenyl group.

The macromonomers of formula I may be reacted to form comb polymers in extremely interesting fashion. A preferred variant of the method is copolymerization of the macromonomers of formula I with (meth)acrylic acid esters of formula VI:

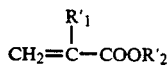

where $R'_2$ represents an alkyl group with 1–40, preferably 1–24, C atoms; and $R'_1$ represents hydrogen or methyl, in the presence of an initiator IN. The polymerization is carried out by bulk or preferably solution polymerization, e.g. in an ester such as butyl acetate. The initiator IN is added in customary amounts, e.q. portionwise in a total amount of 0.01–0.5 wt. %, preferably c. 0.1 wt. %. The initiator may be dissolved in, e.g., an aliphatic solvent or in the monomers.

A. Preparation of the hydroxyl-group-terminated polyalkyl methacrylate III

The polymer III is advantageously prepared by radical polymerization methods known in the art (see Rauch-Puntigam, H, and Voelker, Th., 1967, "Acryl- und Methacrylverbindungen", pub. Springer-Verlag, Berlin).

For example, one may proceed by heating the monomer of formula IV:

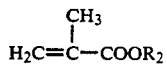

where $R_2$ has the above-defined meaning, in a customary polymerization reactor equipped with a stirrer, cooling jacket, reflux condenser, thermometer, and dropping feed device, to a suitable temperature of normally about 90°±5° C., advantageously under an inert gas such as argon, nitrogen, or the like.

After the prescribed temperature is reached, a bifunctional agent HX-OH is added which has a chain X as described above and a terminal OH group, and, in fact, can be a compound of formula V

where X' represents an alkylene group with 2–20 C atoms, preferably 2–12 C atoms in the chain, with the chain possibly being interrupted by 1–9 ether oxygen bridges. The alkylene group X' may be alkyl-substituted and may be cyclic, and is subject to the condition that at least two C atoms must be present in the chain between each two hetero atoms. The alkyl substituents should have 1–6 C atoms.

Secondary and cyclic alcohols are thus included among compounds of formula V. Examples of compounds of formula V are 2-mercaptoethanol, 3-mercaptopropanol, 4-mercaptobutanol, and trans-2-mercaptocyclohexanol.

After the addition of the bifunctional, hydroxyl-group-containing agent in amounts of 0.5–10 mol %, based on the amount of monomeric compound of formula IV charged, the polymerization is begun by addition of initiator IN, preferably dissolved in small amounts of monomer IV, with the amount of initiator being 0.001–0.2 wt. %, based on the weight of the monomer.

Advantageously, the initiator IN used here includes those which have a decomposition half life of ≦10 hr at 45°±5° C. (See Mark, H. F., et al., loc.cit., Vol. II, 2; and Brandrup, J., and Immergut, E. H., 1989, "Polymer Handbook", 3rd Ed., Vol. II, pub. J. Wiley & Sons, 1.)

Examples of initiators which might be cited are tert-butylperacyl compounds, such as tert-butyl perneodecanoate, tert-amyl perneodecanoate, tert-butyl 2,2-diethyl-perbutyrate, and the like.

As a rule, the polymerization begins rapidly, and commonly the temperature in the reactor rises rapidly, reaching 95°–98° C. Advantageously, one waits until the interior temperature decreases again, and then advantageously one adds an additional portion of the selected initiator IN dissolved in the monomer of formula IV, from one dropping funnel, and an additional portion of the compound of formula V, from a second dropping funnel, with these additions being carried out dropwise over a period of several hours, e.g. 4 hr. During the addition the temperature is advantageously kept within the range 94°–98° C., and thereafter the mixture is held at 96°–98° C. for c. 20 min. Subsequently the final polymerization phase is begun, which is characterized by dropwise addition of additional initiator IN, preferably in a suitable solvent such as toluene, over a period of a few or several hours, e.g. 4 hr. Then advantageously stabilizers may be added, e.g. of the sterically hindered amine type (HALS), e.g. bis-2,2,6,6-tetramethyl-4-piperidyl sebacate, in the usual amounts, 0,01 wt. %, based on the weight of the monomer, preferably dissolved in an inert solvent such as toluene. Then the mixture is cooled to room temperature, and the polymer is recovered as a solid, e.g. by precipitation with an antisolvent such as, e.g., methanol.

Alternatively to isolation by precipitation, the solid may be recovered by degassing on an extruder.

The hydroxyl-group-terminated polyalkyl methacrylates can also be prepared in simple fashion by slow bulk polymerization (e.g. in Hostaphan ® bags) with an initiator (e.g. AIBN) present at low concentration, e.g. under the conditions of 50° C. for 96 hr. (See Ger. OS 39 02 653, or Albrecht, K., et al., 1986 *Makromol. Chem.*, 145/146, 89–100.)

Other polymerization techniques, e.g. solution polymerization, are possible, wherewith as a rule the ratio, in parts by weight, of the initiator used to the regulator used is in the range 1:10 to 1:10,000, preferably in the range 1:20 to 1:1,000.

B. Preparation of the methacryloyl-terminated macromonomer of formula I:

Advantageously, in preparing the macromonomers of formula I one employs a round-bottomed flask equipped with a stirrer, a thermometer, a reflux condenser with a Dean-Stark trap for removing water, and an air leak tube to admit dry air.

In this apparatus one dissolves the prescribed amount of the compound of formula III in a sufficient amount of the monomer of formula II.

Although the stoichiometry of the reaction equations indicates that equimolar amounts of the reactants react, it is recommended from a practical standpoint that a molar excess of the monomer of formula II be used, to the extent of a factor of from 1.5 to 1,000. If only a relatively slight molar excess of the monomer of formula II is used, it is recommended that in addition one use a solvent selected from the group of low-boiling aromatics, alkylaromatics, or esters. Preferably, the monomer component II is used simultaneously as a reaction medium, i.e. the compound III is used in an amount of c. 10–30 wt. % in the monomer of formula II. Advantageously, one also employs stabilizers, which are per se known, e.g. of the type of sterically hindered phenols, e.g. 4-methyl-2,6,-di-tertbutylphenol, or aromatic diamines, e.g. o-phenylenediamine (see 1978 "Ullmanns Encyclopaedie der Techn. Chemie, 4th Ed., Band 15, pub. Verlag Chemie, p. 260). A suggested amount is 0.01–0.5 wt. %, based on the weight of the compound of formula II.

In general, the reaction mixture is heated at boiling until no more water separates out. Advantageously one then adds the transesterification catalyst, which is preferably an orthotitanic acid ester (see British Pats. 960,005 and 962,928), particularly preferably of formula VII:

$$\text{Ti}(OR_4)_4 \qquad \qquad VII$$

where $R_4$ represents alkyl group with 1–20 C atoms preferably 1–6 C atom. A preferred titanate ester of formula VII is isopropyl titanate. The catalyst is normally employed in an amount of 0.1–5 wt. %, preferably 0.5–1.5 wt. %, based on the weight of the compound II.

Then, advantageously, the mixture is reheated at boiling for a few hours, e.g. c. 3 hr, and then allowed to cool to c. 85° C., whereupon a small amount of water, on the order of c. 1.7 times the amount of the added catalyst, is added dropwise.

Then, after cooling, advantageously the mixture is filtered, e.g. through a pressure filter, to remove precipitates which are produced. The clear, colorless filtrate can then be evaporated to dryness, e.g. on a reaction evaporator. Further refinement may be carried out, e.g. by dissolving the residue left after evaporation in a suitable solvent such as acetone and precipitation by dropwise addition of a relatively large amount of water, namely about 4 times the amount of the monomer II employed. The precipitated material is removed by suction filtration, and can be dried, e.g., in a circulating air drying cabinet, at a temperature of on the order of 60° C.

C. Preparation of Comb Polymers From the Macromonomer of Formula I

To synthesize comb polymers, advantageously one employs a stirred reactor equipped with a protective-gas feed line, cooling jacket, thermometer, and stirring-resistance meter. A protective inert gas such as argon should be employed.

The reactor is charged with 10–90 parts by weight (pbw), preferably 15–50 pbw, particularly preferably 20–40 pbw, of the monomer of formula I, and c. 90–10 pbw, preferably 50–85 pbw, particularly preferably 90–60 pbw, of a monomer of formula VI in a suitable inert solvent, such as, e.g., butyl acetate, and the mixture is heated to the decomposition temperature of the initiator IN, e.g. 50° C., if the initiator used is tert-butyl perneodecanoate.

The initiator is now added, preferably in a solution of a strength of about 75% in an inert solvent, either batchwise or in portions. The temperature in the reactor is maintained below 60° C., by cooling during the course of the polymerization, see Ger. OS 39 02 653. After a total of c. 8 hr polymerization time, the polymerization is terminated, advantageously by addition of a stabilizer of the HALS type. The polymer may be isolated by precipitation, e.g. with a relatively large amount of methanol, or alternatively by degassing in an extruder.

Having now generally described this invention, a further understanding can be obtained by reference to certain specific examples which are provided herein for purposes of illustration only and are not intended to be limiting unless otherwise specified.

EXAMPLES

A: Synthesis of the hydroxyl-group-terminated Polymethyl methacrylate of formula III

EXAMPLE A-1

A 200 g amount of methyl methacrylate was heated to 90° C. in a 2 L reactor with cooling jacket, stirrer, reflux condenser, dropping funnel, and thermometer.

When the interior temperature reached 90° C., 4 g mercaptoethanol was added. Then the polymerization was initiated by addition of 0.04 g tert-butyl perneodecanoate (75% in an aliphatic solvent) dissolved in 10 g methyl methacrylate.

The polymerization began immediately. The temperature in the reaction vessel increased to c. 95°–98° C. within 5 min, and then decreased, at which point the following were added simultaneously through two different dropping funnels over a period of 4 hr:

From funnel 1: 0.4 tert-butyl perneodecanoate, dissolved in 780.0 g methyl methacrylate;

From funnel 2: 16.0 g. mercaptoethanol.

During this reaction period the temperature in the reactor was maintained in the range 94°–98° C., and thereafter 20 min at c. 96°–98° C.

Then a solution of 0.5 g. tert-butyl perneodecanoate in 250 g toluene was added portionwise over a period of 4 hr at 96°–98° C. (final polymerization). Then 0.02 g Tinuvin ® 770 in 250 g toluene was added as a stabilizer, the mixture was cooled to room temperature, and the product was recovered as a solid, by precipitation in methanol.

As an example, 660 g of a colorless, brittle polymer was obtained. J=11.3 ml./g.

B: Preparation of the methacryloyl-terminated macromonomer of formula I

EXAMPLES B-1 to B-3

Apparatus employed: A 2 L four-necked round-bottom flask equipped with stirrer, thermometer, reflux condenser with a Dean-Stark trap for removing water, and an air leak tube to admit dry air.

Procedure: The stated amount of hydroxyl-group-terminated polymethyl methacrylate of formula III according to Example A (see Table 1) along with one gram of 4-methyl- 2,6-di-tertbutylphenol was dissolved in 1,000 g of the given (meth)acrylic acid ester, and the mixture was heated at boiling until no more water separated out. Then 12 ml isopropyl titanate was added. The mixture was heated another 3 hr at boiling and then was allowed to cool to 88° C., at which point 20 ml water was added dropwise. The fully cooled residue was subjected to pressure filtration (Seitz S 500 filter medium) to remove the precipitate which was produced. The clear, colorless filtrate was evaporated to dryness using a rotary evaporator. The residue was then dissolved in 700 ml acetone, and the macromonomer of formula I was precipitated-out by adding the mixture dropwise to 4 L water. The precipitate was filtered out and dried in a circulating-air drying cabinet at 60° C.

was initially added, and a 0.2 g amount of initiator was added after 3.5 hr.

The temperature in the reactor was maintained below 60° C. by cooling. After a total of 8 hr polymerization time, the polymerization was terminated by addition of 0.1 g Tinuvin 770 in 500 g butyl acetate, and the polymer was isolated by precipitation in 15 L methanol. Alternatively the polymer may be isolated by degassing in an extruder. After drying, a clear, extensible, nonbrittle polymer was obtained. J=331 ml/g.

The polymer had an ultimate tensile strength $\sigma_R=11.5$ MPa and an elongation at failure $\epsilon_R=433\%$.

EXAMPLE C-2

A 327 g amount of the macromonomer solution in butyl acrylate according to Example B-2, comprised of 30 wt. % of the macromonomer and 70 wt. % of butyl acrylate, was diluted with 560 g butyl acetate and heated to 51° C. under argon.

The polymerization was initiated by repeated addition of tert-butyl perneodecanoate (75% in an aliphatic solvent) (0.2 initially, 0.2 g after 40 min, 0.2 g after 60 min, and 0.2 g after 80 min). After 3 hr, the interior temperature reached about 60° C.

After 7 hr the interior temperature had decreased to 53° C., and the stirring resistance had increased substantially.

To terminate the polymerization, 0.1 g Tinuvin ®770 in 500 g butyl acetate was added. The mixture was diluted with an additional 500 g butyl acetate for precipitation in methanol.

A clear, light yellow, nonbrittle polymer was obtained.

J=289 ml/g, $\sigma_R=9.4$ MPa, $\epsilon_R=590\%$.

Having now fully described the invention, it will be

| Example No. | Reactant Compound of Formula No. | Reactant Compound of Formula II | Amount of Compound of Formula II(g) | Molecular Weight by Size Exclusion Chromotography (SEC)**** | | | Yield | Terminal group content by $^1$H-NMR*** |
|---|---|---|---|---|---|---|---|---|
| | | | | MW | MN | U | | |
| B-1 | III | Methylmethacrylate | 140 | 20 400 | 8 910 | 1.29 | 78% | 1.5 Mol % = MN = 6 600 |
| | I | | | 11 200 | 6 420 | 0.74 | | |
| B-2 | III | Butylacrylate | 120 | 20 400 | 8 910 | 1.29 | | — |
| | I | | | 15 500 | 6 390 | 1.43 | 100%* | |
| B-3 | III | Butylacrylate | 100 | 10 900 | 5 220 | 1.08 | | 2.0 Mol % = MN = 5 000 |
| | I | | | 11 300 | 5 540 | 1.03 | 95%** | |

FOOTNOTES to TABLE 1:
*The product was not isolated as a solid but by removing excess butyl acrylate by distillation to yield a solution of the product in butyl acrylate with a solids content of about 30%.
**Product isolated by evaporation to dryness. Not refined by re-precipitation.
***The NMR apparatus was a Varian XL 200; measurements in CDCl₃ as solvent; internal standard tetramethylsilane; measuring temperature 22° C.
****For the SEC the apparatus was a Waters 150° C., the eluent tetrahydrofuran; the column material crosslinked polystyrene (pore size 500 Å + 10⁴ Å); measuring temperature 35° C.; calibration with PMMA standard sample, flow rate 1 ml/in.

C: Synthesis of Comb Polymers From the macromonomer of formula I:

EXAMPLE C-1

The following were charged under argon to a stirred reactor with a protective-gas inlet, cooling jacket, and stirrer resistance meter:
96 g of the macromonomer according to Example B-1;
224 g butyl acrylate;
480 g butyl acetate.
The mixture was heated to 51° C.

A 0.1 g amount of 75% solution of tert-butyl peroxyneodecanoate, as an initiator, in an aliphatic solvent apparent to one of ordinary skill in the art that many changes and modifications can be made thereto without departing from the spirit or scope of the invention as set forth herein.

What is claimed as new and desired to be secured by Letters Patent of the United States is:

1. A method of synthesizing a macromonomer of formula I:

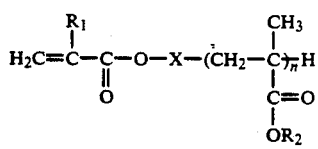 I wherein $R_1$ is hydrogen or methyl,
X is a biradical group, and
$R_2$ is an alkyl group of 1–40 carbon atoms, and
n is such that the molecular weight of the macromonomer I is in the range of 500–100,000 Dalton,
which comprises:
conducting transesterification between a monomeric ester of formula II:

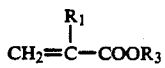 II where $R_3$ is an alkyl group with 1–8 carbon atoms, and a hydroxyl-group-terminated polyalkyl methacrylate of formula III:

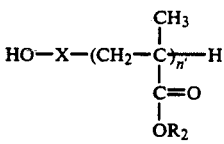 III wherein X and $R_2$ have the same meanings as defined above, and $n'-n$; and
eliminating the alcohol $HOR_3$, thereby resulting in the formation of the compound of Formula I.

2. The method according to claim 1, wherein the transesterification reaction is conducted in the presence of an orthotitanic acid ester catalyst.

3. The method according to claim 2, wherein said catalyst is isopropyl titanate.

4. The method according to claim 1, wherein a 1.5 to 1000 molar excess of monomer II is used per unit amount of monomer III.

5. The method according to claim 2, wherein the amount of catalyst in the reaction medium ranges from 0.1–5 wt %. based on compound II.

* * * * *